(12) United States Patent
Behling et al.

(10) Patent No.: US 6,221,131 B1
(45) Date of Patent: Apr. 24, 2001

(54) MULTI-STAGE PROCESS FOR THE SEPARATION/RECOVERY OF GASES

(75) Inventors: Rolf-Dieter Behling, Hamburg; Klaus-Viktor Peinemann; Klaus Ohlrogge, both of Geesthacht; Jan Wind, Lauenburg, all of (DE); Lidia Barreto da Silva, Rio de Janeiro (BR)

(73) Assignees: Petroleo Brasiletro S.A.-Petrobras, Rio de Janeiro (BR); GKSS Forschungszentrum Geesthacht GmbH, Geesthacht (DE)

( * ) Notice: Subject to any disclaimer, the term of this patent is extended or adjusted under 35 U.S.C. 154(b) by 0 days.

(21) Appl. No.: 09/168,899

(22) Filed: Oct. 9, 1998

(30) Foreign Application Priority Data

Oct. 9, 1997 (EP) .................................................. 97117455
Jun. 2, 1998 (EP) .................................................. 98110012

(51) Int. Cl.[7] .......................... B01D 53/22; B01D 53/047
(52) U.S. Cl. .......................... 95/50; 95/53; 95/55; 95/96
(58) Field of Search .................................. 95/45, 47–55, 95/96–98, 100–105

(56) References Cited

U.S. PATENT DOCUMENTS

| | | | |
|---|---|---|---|
| 4,180,388 | * 12/1979 | Graham et al. | 95/55 |
| 4,398,926 | 8/1983 | Doshi | 55/16 |
| 4,690,695 | 9/1987 | Doshi | 55/16 |
| 4,701,187 | * 10/1987 | Choe et al. | 95/53 |
| 4,781,907 | * 11/1988 | McNeill | 95/51 X |
| 4,994,094 | * 2/1991 | Behling et al. | 95/50 X |
| 5,032,148 | * 7/1991 | Baker et al. | 95/50 |
| 5,169,412 | * 12/1992 | Prasad et al. | 95/52 X |
| 5,233,837 | * 8/1993 | Callahan | 95/51 X |
| 5,281,253 | * 1/1994 | Thompson | 95/45 X |
| 5,282,969 | * 2/1994 | Xu | 95/45 X |
| 5,332,424 | * 7/1994 | Rao et al. | 95/50 X |
| 5,354,547 | * 10/1994 | Rao et al. | 95/45 X |
| 5,378,263 | * 1/1995 | Prasad | 95/45 X |
| 5,383,956 | * 1/1995 | Prasad et al. | 95/45 |
| 5,425,801 | * 6/1995 | Prasad | 95/45 X |
| 5,482,539 | * 1/1996 | Callahan | 95/51 |
| 5,538,536 | * 7/1996 | Fuentes et al. | 95/45 |
| 5,611,842 | * 3/1997 | Friesen et al. | 95/45 X |
| 5,709,732 | * 1/1998 | Prasad | 95/45 |

FOREIGN PATENT DOCUMENTS 0 684 066   11/1995   (EP) .

* cited by examiner

Primary Examiner—Robert H. Spitzer
(74) Attorney, Agent, or Firm—Sughrue, Mion, Zinn, Macpeak & Seas, PLLC

(57) ABSTRACT

A process for separating and/or recovering gases from gas and/or gas vapor mixtures includes a membrane separating device to which a gas and/or gas vapor mixture is supplied, the latter being separated in the membrane separating device into a permeate, which is enriched with gas, and a retentate, which is depleted of gas. A first membrane separating device and a downstream second membrane separating device are provided, to which is supplied (at its inlet end) the retentate from the first membrane separating device, the first membrane separating device having a membrane which is selective for higher hydrocarbons in the gas and/or gas vapor mixture to be separated and in that the second membrane separating device has a membrane which is selected for gases of small molecular diameter.

28 Claims, 3 Drawing Sheets

MULTI-STAGE PROCESS FOR THE SEPARATION/RECOVERY OF GASES

FIELD OF THE INVENTION

The invention relates to a process for the separation and/or recovery of gases from gas and/or gas vapour mixtures by means of a membrane separating device to which the gas and/or gas vapour mixture is supplied, the latter being separated in the membrane separating device into permeates enriched with gas/vapours and retentates which are depleted of gas/vapours. The membrane separating device may comprise the use of different membrane types. Typically one said membrane type used is made of glassy polymers and is highly permeable to gases of small kinetic diameter, such as $H_2$ or He, whilst another said membrane type used is made of rubbery polymers and is highly permeable to condensable gases/organic vapours, such as $C_2$ and higher hydrocarbons. If further purification of the desired component(s) is sought, a PSA or cryogenic system may be incorporated to the membrane separating device.

BACKGROUND INFORMATION

Up to now, the economic treatment of gas mixtures, such as occur for example in the petroleum industry, but also in petrochemicals, represents a problem which has not yet been satisfactorily solved. Processes using the membrane separating technique for the separation or recovery of gases of high purity, greater than 99%, are fundamentally known, particularly in the combination of membrane separating devices with pressure swing adsorption devices. Where high product purities are demanded, exclusively membrane separating processes are classified as being uneconomic because the multi-stage recirculation of the permeate streams demand an excessively high expenditure of energy and excessively high costs for recompression. The combination of membrane separating devices and pressure swing adsorption devices can only be economically operated where the initial content of desired gases to be separated from the gas/vapour mixture, for example H2, is above 40 mole % and where a high feed pressure is available. Because the glassy polymer membranes previously employed for this purpose in the membrane separating device must, as a precondition, exhibit selectivity which is as high as possible despite low fluxes, it is necessary to set the highest possible pressure to the inlet of the separating device, for example between 40 and 130 bar, in order to be able to utilise the selectivity of the membranes. The downstream pressure swing adsorption device was likewise operated in the known arrangements at a relatively high adsorption pressure, preferably 40 bar and higher. The compression costs are very high so that the total separating process can only be operated economically when the mixture to be separated is already available at high pressure.

Processes of the type previously described are known, for example, from U.S. Pat. No. 4,398,926 and U.S. Pat. No. 4,690,695. In EP-A-0684066, the recovery of H2 or He is known from high pressure supply flow in which the inlet concentration of H2 or He can be below 30% by volume, where the impurities are caused by higher hydrocarbons. Under these conditions, the hydrogen can be raised in a membrane unit to 40% in the permeate before the permeate is supplied, after recompression, to a pressure swing adsorption device in which the light component, for example H2, is enriched to over 98%. The energy consumption for the recompression is controlled, at the expense of the yield, by extracting only a small permeate flow.

It is, therefore, an object of the present invention to create a process by means of which, at low energy requirements, simultaneous separation or recovery of high purity gases having a small kinetic diameter and of condensable gases/vapours in highly concentrated form can be achieved by applying moderate pressure only, it being possible for the gas and/or gas vapour mixture which has to be separated to have a low concentration of the components to be enriched:

The object is achieved, according to the invention, by at least one membrane separating unit having an organophilic membrane which is selective for C2 and higher hydrocarbons combined with at least one membrane separating unit having a glassy membrane which is selective for gases of small kinetic diameter to which is supplied at the inlet end the retentate from the organophilic membrane separating unit.

The advantage of the process according to the invention lies essentially in the fact that, as desired, simultaneous economical separation and/or recovery of gases with a small kinetic diameter such as hydrogen or helium and condensable gases/vapours, such as C2 and higher hydrocarbons from gas and/or gas vapour mixtures is possible. From the point of view of ecology also, the process according to the invention is advantageously characterised by substantially reduced energy requirements as compared with known processes because the process can be operated at relatively moderate pressures. The process is also advantageously applicable where the gases/vapours to be separated are only available in small or even in only very small molar concentrations in the mixture.

PREFERRED MODES

In carrying out the present process, it is advantageous that the organophilic membrane(s) used in the organophilic membrane unit(s) are made from elastomer or rubbery polymers which are for example manufactured from silicone rubber, the silicone rubber advantageously consisting of POMS or PDMS. These membranes of the first membrane separating device (b) are therefore organophilic membranes through which gases or vapours, for example C2 and higher hydrocarbons, permeate selectively.

In said advantageous embodiment of the process, the membranes of the glassy membrane unit(s) consist of a so-called glass-type membrane which is for example manufactured either from polyamide-imide or from aromatic polyimides. These membranes are selective with respect to gases of small kinetic diameter, for example hydrogen or helium.

In order to have sufficient pressure energy (pressure inventory) available for the separation of the gas and/or gas vapour mixture to be separated and supplied to the organophilic membrane unit(s) and sufficient pressure energy for the permeate to be generated there, the primary gas and/or gas vapour mixture to be separated has a pressure between 1 and 30 bar, advantageously between 2 and 15 bar at inlet to the organophilic membrane unit(s).

In another embodiment of the invention, the primary gas and/or gas vapour mixture to be separated preferably has its temperature moderated before inlet to the organophilic membrane unit(s) in order to optimize the separation result, the temperature being then advantageously in the range between 0 and 25 C.

Fundamentally, the moderation of the temperature of the gas and/or gas vapour mixture to be separated can take place in any given suitable manner and will essentially depend on whether its temperature is located higher or lower within the range of the temperature which is optimum for the separation procedure of the gas and/or gas vapour mixture. In a further advantageous embodiment of the process, the moderation in the temperature then takes place by means of a heat exchanger/cooler upstream of the organophilic membrane unit(s), through which heat exchanger/cooler is fed the gas and/or gas vapour mixture to be separated before inlet to the organophilic membrane unit(s).

In order to remove impurities from the gas and/or gas vapour mixture to be separated, which impurities could easily, should they enter unhindered, lead to destruction of the actual membrane or also to blockage and therefore likewise to making the membrane ineffective, it is advantageous to pretreat/filter the primary gas and/or gas vapour mixture to be separated before inlet to the first membrane separating device; a separate filter device can be provided for this purpose. To optimise the separating procedure of the gas and/or gas vapour mixture in the organophilic membrane unit(s), a reduction in pressure is preferably effected on the permeate side of the organophilic membrane unit(s), the pressure on the permeate side being advantageously in the region of 1–2 bar.

Depending on the degree of separation, on the one hand, and the degree of purity of the first desired product of the organophilic membrane unit(s), on the other, it can be advantageous to subject the permeate leaving the organophilic membrane unit(s) to further purification, whereby a cooling device such as cryogenic distillation can be provided, for example, for the further purification. Other repurification stages, which operate in accordance with other physical/chemical principles, are also conceivable however.

The retentate leaving the organophilic membrane unit(s), which exhibits a pressure approximating to that found in the gas and/or gas vapour mixture to be separated before inlet to the membrane unit(s), for example between 2 and 15 bar, advantageously has its pressure increased before inlet to the glassy membrane unit(s) so that sufficient pressure energy is available for the separating procedure of the retentate of the organophilic membrane unit(s) when it is supplied to the glassy membrane unit(s); it is also advantageous in this case to moderate the temperature of the retentate before inlet to the glassy membrane unit(s), and in the range between 40 and 120 C, preferably 70 and 80 C, in order to optimise the separating procedure.

The increase in pressure of the retentate before inlet to the glassy membrane unit(s) preferably takes place to the range between 30 and 40 bar.

The moderation of the temperature of the retentate before inlet to the glassy membrane unit(s) advantageously takes place by means of an upstream heat exchanger/heater.

The permeate leaving the glassy membrane unit(s) is advantageously guided via an adsorption device, with the permeate which is greatly enriched with gases of small kinetic diameter having its pressure reduced to the range between 1 and 2 bar, in contrast to the retentate which exhibits a pressure of some 25 to 40 bar or even higher.

The adsorption device, which purifies the permeate once again in order to supply a high-purity second product at outlet from the adsorption device, is preferably operated in accordance with the pressure swing adsorption principle.

In order to optimise the further purification of the permeate in the adsorption device, it is advantageous to increase the pressure of the permeate of the glassy membrane unit(s) before inlet to the adsorption device, for example to a pressure in the range between 18 and 20 bar.

To increase the pressure, use is advantageously made of the pressure energy of the retentate of the glassy membrane unit(s), which corresponds approximately to the pressure of the increased pressure retentate of the organophilic membrane unit(s) present at inlet to the glassy membrane unit(s), for example in the range between 25 and 40 bar or even higher. This pressure energy is advantageously used to operate a turbo-expander which is driven by means of the retentate, which is at high pressure, of the glassy membrane unit(s).

In order to achieve the optimum adsorption conditions for the permeate of the glassy membrane unit(s) in the adsorption device, the permeate advantageously has its temperature suitably moderated or lowered before inlet to the adsorption device. The retentate of the glassy membrane unit(s), which now leaves the turbo-expander with its pressure lowered, can now be connected directly back into the process circuit at the inlet end (with its pressure correspondingly increased) or it can, however, be advantageously supplied to a third membrane separating device whose retentate, as previously, is in turn connected into the inlet of the process circuit. However, the permeate, as the third product, may possibly be extracted at outlet from the adsorption device at a degree of purity which is not as high as that of the second product from the process circuit.

The desorption or purge gas flow leaving the adsorption device is also advantageously recycled for connection into the process circuit, with the desorption or purge gas flow having its pressure increased and/or temperature moderated as specified before connection into the process circuit, depending on the point of connection into the process circuit.

As mentioned above, the permeate of the organophilic membrane unit(s) is fed through a repurification stage and is there further purified so that it leaves the process as the first product. The retentate of the glassy membrane unit(s) is preferably repurified in the same device in which the permeate of the organophilic membrane, unit(s) is also repurified.

This repurification can take place in a cooling stage or, advantageously, in an absorption/condensation unit.

The invention is now described in detail with reference to the diagrammatic drawings using an embodiment example and further modified embodiment examples. In the drawing.

Figure 1:
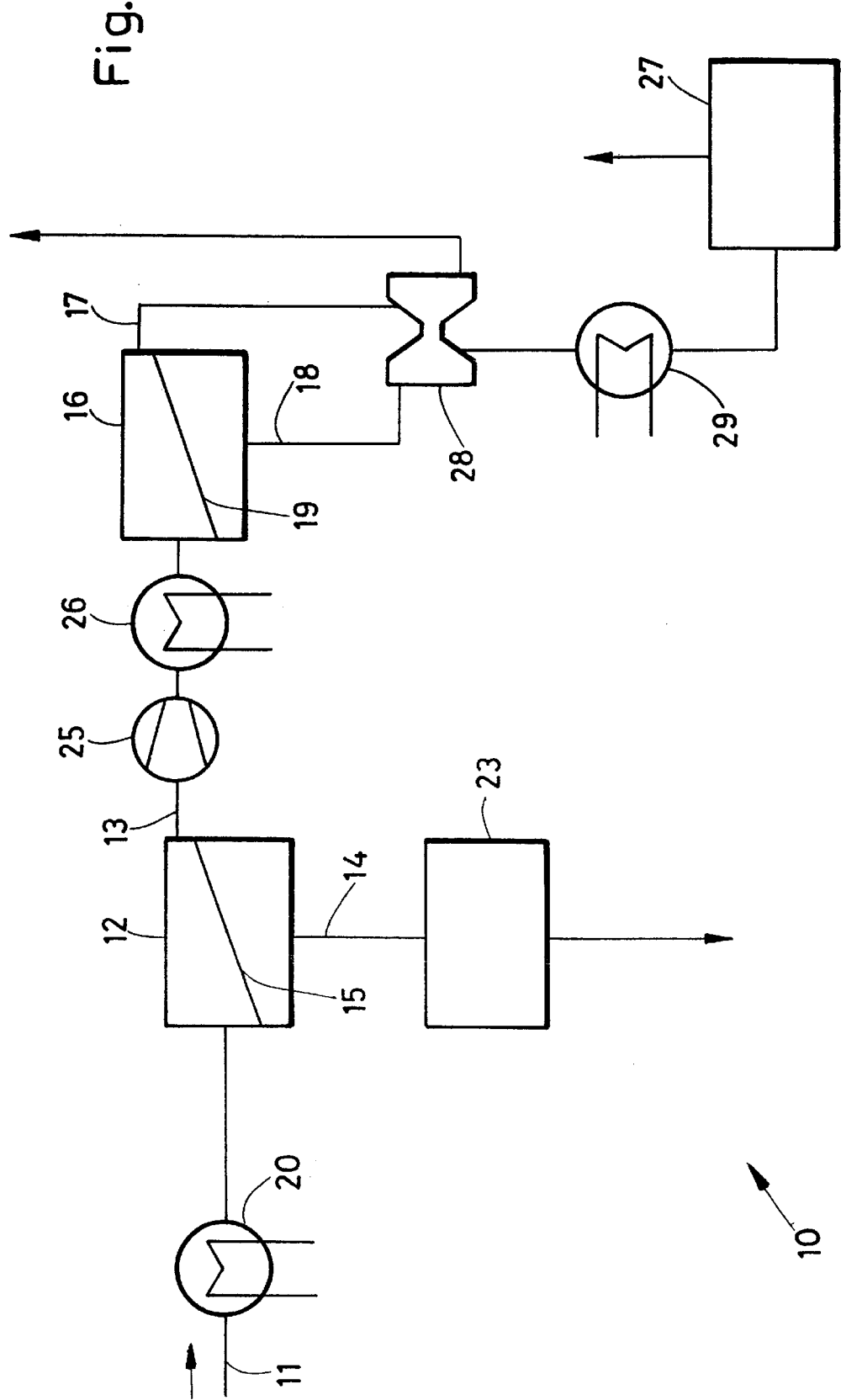
FIG. 1 shows a basic version of an appliance for carrying out the process according to the invention and FIG. 2 shows a modified version of the appliance and, therefore, a process path which is modified relative to the process path shown in FIG. 1.

Reference is first made to the representation of the appliance or arrangement 10 for carrying out the process according to the invention as shown in FIG. 1. A gas and/or gas vapour mixture which has to be separated, such as is found in the petroleum industry and petrochemicals, has its pressure increased to an outlet pressure of between 8 and 15 bar by means of pumps or compressors (not shown here) and is supplied to the appliance 10 as a gas and/or gas vapour mixture which has to be separated or as a feed 11.

The gas and/or gas vapour mixture 11 is first supplied to a heat exchanger 20 and there has its temperature moderated to a suitable temperature in the range between 10 and 20 C. In order to filter out particulate impurities in the gas and/or gas vapour mixture or feed 11 from the mixture to be separated, a pre-treatment filter device 21 can be provided between the heat exchanger/cooler 20 and the downstream organophilic membrane unit(s) 12, see FIG. 2.

The organophilic membrane unit(s) 12 is equipped with a membrane 15 of a first membrane type. This membrane 15 is an elastomer or rubber-type membrane which is manufactured from silicone rubber, for example; the silicone rubber can be POMS or PDMS. This organophilic membrane is selective for higher hydrocarbons in the gas and/or gas vapour mixture 11 to be separated (C2 and higher hydrocarbons). These C2 and higher hydrocarbons are separated in the organophilic membrane unit(s) 12 in the form of the permeate 14 and delivered to a repurification stage 23. They are then delivered as the first highly enriched product for further use. The retentate 13 leaving the organophilic membrane unit(s) 12 at approximately the same pressure as the gas and/or gas vapour mixture 11 supplied to the membrane unit(s) 12 represents the gas flow which is depleted of condensable gases or vapours. This gas flow is first fed through a pump compressor 25, where its pressure is increased and, in fact, preferably to the range between 25 and 40 bar. The pressurised retentate 13 from the organophilic membrane unit(s) 12 is fed through a heat exchanger/heater 26 and there brought to a temperature of between 50 and 80 C. At this point, it should be noted that the condensable components in the gas and/or gas vapour mixture are depleted in the organophilic membrane unit(s) in such a way that in the downstream glassy membrane unit(s) 16 (which follows the increase in pressure by the pump 25) i.e. in the process section through the glassy membrane unit(s) 16, no condensation takes place on the actual glassy membrane 19 in the glassy membrane unit(s) 16 despite possible cooling due to the Joule-Thomson effect.

The glassy membrane 19 in the glassy membrane unit(s) 16 is a so-called glass-type membrane which is manufactured either from polyamide-imide or from aromatic polyimide. This glassy membrane 19 in the glassy membrane unit(s) 16 is selective for gases with small molecular diameters, for example for hydrogen or helium. In the glassy membrane unit(s) 16, the retentate 13 (which has had its temperature and its pressure increased) from the organophilic membrane unit(s) 12 is separated into a retentate 17 and a permeate 18. The permeate 18 has had its pressure greatly reduced, for example to within the range of between 1 and 2 bar, and is greatly enriched with the previously mentioned light gases of small kinetic diameter. The permeate 18 is fed through a turbo-expander 28 and is subsequently present at a higher pressure, for example in the range between 18 and 20 bar, and is supplied to an adsorption device 27 for further purification, possibly after being fed through a heat exchanger cooler 29. The adsorption device 27 operates, for example, in accordance with the pressure swing adsorption (PSA) principle. The operation of the turbo-expander 28 is effected by the high pressure energy of the retentate 17 from the glassy membrane unit(s) 16, which is present at approximately the supply pressure of between 25 and 40 bar of the retentate 13 of the organophilic membrane unit(s) 12 at inlet to the glassy membrane unit(s) 16.

After the expansion resulting from its being fed through the turbo-expander 28, the retentate 17 is either supplied to some other application or is again connected into the process circuit. Various connection possibilities are available depending on the degree of enrichment in desired component(s).

A second product, gases of small kinetic diameter, is then extracted from the adsorption device 27 in highly purified form, for example in the form of 99.9% hydrogen or helium.

Figure 2:
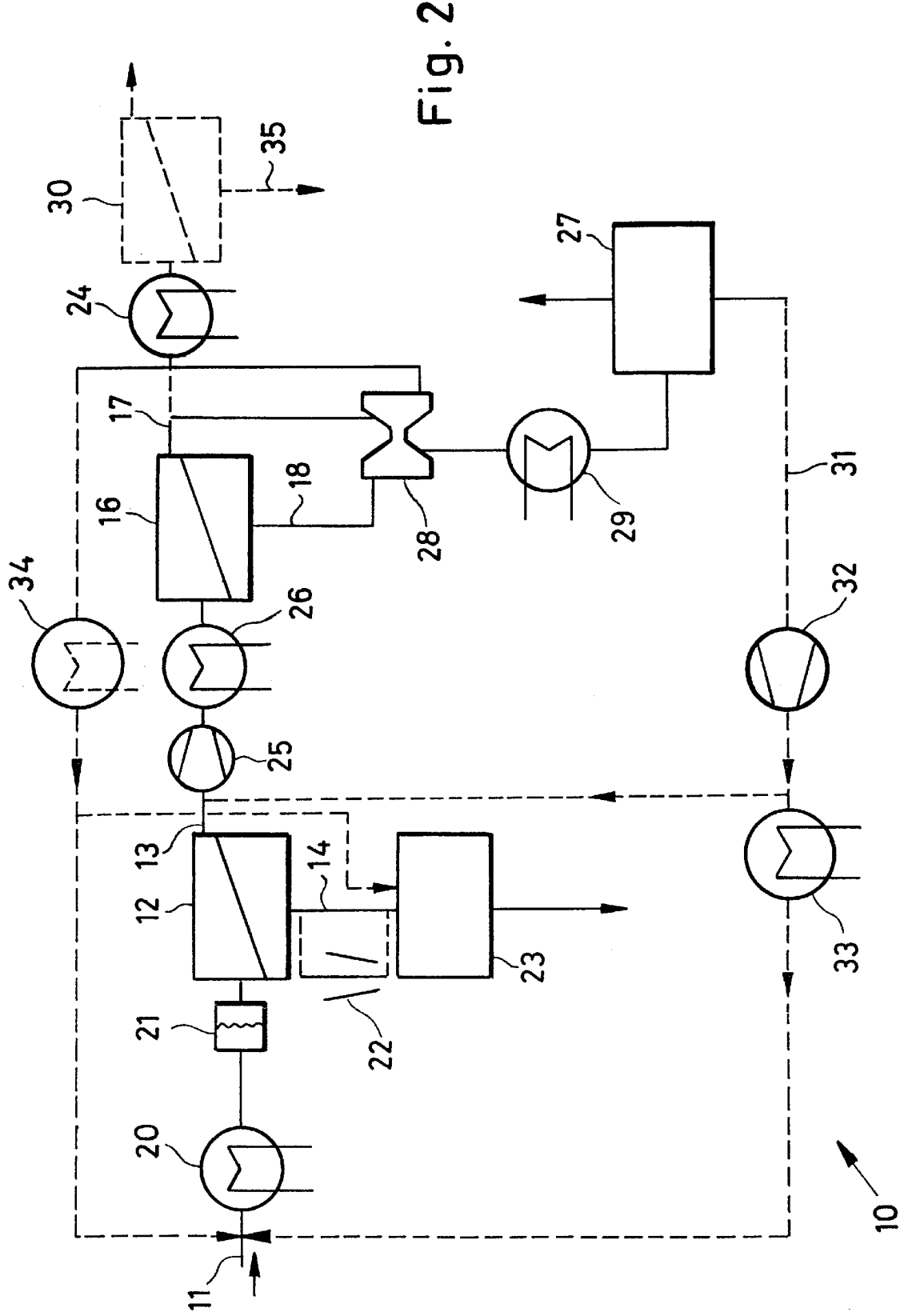

According to embodiment 10 shown on FIG. 2, the desorption or purge gas flow 31 of the adsorption device 27 can be connected afresh into the process at various locations of the embodiment 10 in order to increase the total yield of the process. The desorption or purge gas flow 31 can be recycled, after having its pressure increased in a compressor 32, to the retentate 13 of the organophilic membrane unit 12 or it can be fed through a temperature moderating device such as cooler 33 and from there can be fed afresh to the inlet of embodiment 10, through which inlet the primary gas and/or gas vapour mixture 11 to be separated is supplied to the process circuit. The heat exhanger 33 is then preferably a cooler in order to match the desorption or purge gas flow 31 to the temperature of the gas and/or gas vapour mixture 11 supplied to the organophilic membrane unit 12.

As an alternative, the reduction in temperature can take place in the heat exchanger 20 after the desorption or purge gas flow 31 has been mixed (not shown) with the gas and/or gas vapour mixture 11 to be separated before the mixed flow formed in this way is supplied to the organophilic membrane unit 12.

The retentate 17 of the glassy membrane unit 16 is, as already indicated above, supplied for another use or to the repurification unit 23. This repurification unit 23 is advantageously a cryogenic distillation. Depending on the composition of the permeate 14, the latter can be mixed into the desorption or purge gas flow 31 and/or the permeate 35 leaving organophilic membrane unit 30, after temperature reduction (not shown), before the latter is supplied to the cryogenic distillation unit 23 for further purification. Further purification in a cooling device or a cryogenic distillation unit 23 is of great advantage if, for example, C2 is a desired condensable gas simultaneously recovered by means of the multi-stage membrane separation device. If, on the other hand, higher hydrocarbons, for example C3 to C5 hydrocarbons, are the desired condensable gases/vapours, further purification might advantageously take place in a repurification unit 23 constructed as an absorption/condensation stage.

If the content of desired gases of small kinetic diameter, for example helium, in the primary gas and/or gas vapour mixture 11 to be separated is very small, the pressure ratio between inlet end and permeate side of the organophilic membrane unit 12 is set by a vacuum pump 22. It is then similarly possible to improve the efficiency by providing a vacuum pump (not shown) also for the permeate 18 in the case of the glassy membrane unit, for example unit 16, see FIG. 2. This permits a markedly better pressure ratio to be set.

At this point it should be noted that under circumstances that higher feed pressure, up to 100 bar, can be provided economically to the inlet end of the glassy membrane unit(s), this will set a higher pressure ratio in order to optimise the utilisation of the selectivity of glassy membranes at high fluxes. This could be of particular advantage in alternative embodiments related to FIG. 3.

Any appraisal of the economy of higher feed pressure to be generated should take into account, that the higher pressure energy available in such retentate(s) leaving the glassy membrane unit(s) will improve the efficiency of the turbo-expander(s) such a retentate might be fed through a compressor at various locations in the process circuit where pressure increase of gas/vapour flows is advantageous in order to optimise the separation result.

Finally, instead of the adsorption device 27 and as a departure from the representations of FIGS. 1 and 2, it is possible to provide for the permeate 18 to be supplied to a further glassy membrane unit (not shown) after the pressure is increased preferably in the turbo-expander 28 providing sufficient pressure ratio across the membrane unit to recover a desired gas of small kinetic diameter, for example, hydrogen, with a degree of purity of between 96 and 99 mole %. The retentate of this further glassy membrane unit (not shown) can likewise be recirculated, and it can be connected anew into the process circuit at selected locations (not shown).

Figure 3:
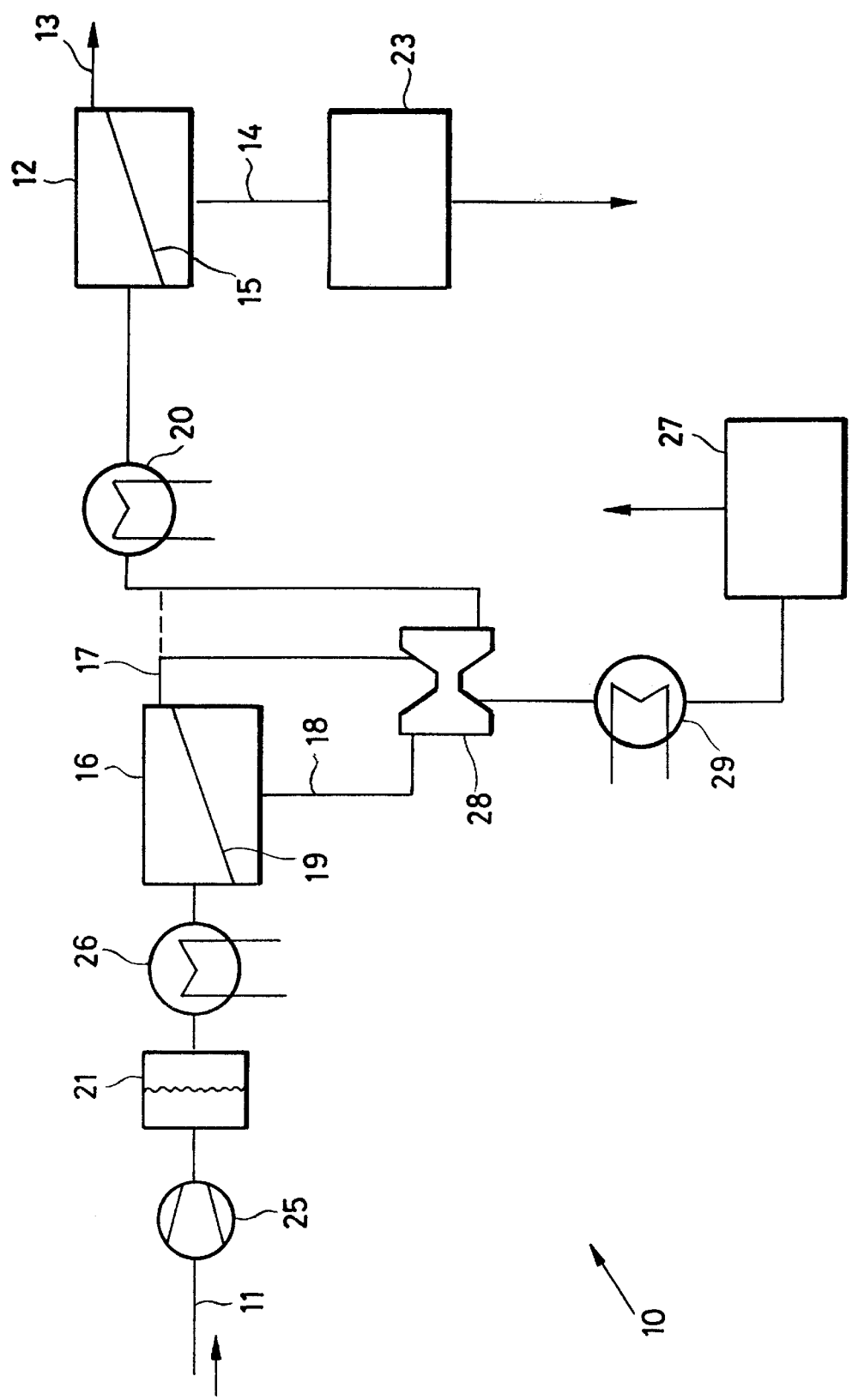
FIG.3 shows an alternative version of an appliance compared to the path shown in FIG. 1 with respect to the location of different membrane units.

Whenever the pressure energy available in the system is not sufficient to meet the requirement of turbo-expander(s) such, equipment(s) can be steam driven. Alternatively electrically-driven compressors can be used instead of turbo-expanders. Wherever compressors are shown in the process circuit they may be replaced by turbo-expander(s) as long as sufficient pressure energy is available. FIG. 3 shows an alternative embodiment or appliance 10 for carrying out the process according to the invention. A gas and/or gas vapour mixture which has to be separated, typically found in the petroleum and gas industry, which might be available at elevated pressure in natural gas flows containing helium in small concentration, i.e. 0,5–5 mole %, for example in the range between 30–100 bar, or if the pressure in the feed 11 is rather lower, has its pressure increased by means of pump/compressor 25 preferably to a range between 30 and 40 bar or higher. The pressurised gas and/or gas vapour mixture is fed through a heat exchanger/heater 26 in order to raise its temperature to a range between 40 and 120 C. preferably between 70 and 80 C. Before passing the pressure increased gas vapour mixture 11 to the inlet of the glassy membrane unit(s) 16 the feed flow is fed through a pretreatment/filter or knockout device 21 to ensure, as said before, that no condensation takes place on the actual glassy membrane 19 in the glassy membrane unit(s) 16. In the glassy membrane unit(s) 16 the feed flow 11 (which has had its temperature and its pressure increased) is separated into a retentate 17 enriched for example with C2 and higher hydrocarbon and a permeate which is greatly enriched with gases of small kinetic diameter and has its pressure greatly reduced. As described before, the permeate 18 is fed through a turbo-expander 28 and subsequently fed at higher pressure, for example in the range between 18 and 20 bar to the adsorption device 27 possibly after being fed through a heat exchange/cooler 29. Alternative options of processing the permeate 18 and/or the desorption purge gas flow 31 and or retentate 17 may be considered as outlined before, see FIG. 1 and 2.

List of designations

10 Embodiment/arrangement
11 Primary gas and/or gas vapour mixture (feed)
12 Organophilic membrane separating device
13 Retentate (of the organophilic membrane unit)
14 Permeate (of the organophilic membrane unit)
15 Organophilic membrane
16 Glassy membrane unit
17 Retentate (of the glassy membrane unit)
18 Permeate (of the glassy membrane unit)
19 Glassy membrane
20 Heat exchanger/cooler
21 Pre-treatment/Filter/Knockout device
22 Vacuum pump
23 Repurification unit
24 Heat exchanger/cooler
25 Compressor
26 Heat exchanger/heater
27 Adsorption device/PSA
28 Turbo-expander/compressor
29 Heat exchanger/cooler
30 Organophilic membrane unit
31 Desorption or purge gas flow
32 Compressor/vacuum pump
33 Heat exchanger/cooler
34 Heat exchanger/cooler
35 Permeate of organophilic membrane unit

We claim:

1. A process for the separation and/or recovery of gases from gas and/or gas vapour mixtures by means of a membrane separating device to which the gas and/or gas vapour mixture is supplied, characterised by a multi-stage, simultaneous separation of such gas and/or gas vapour mixtures in the membrane separating device, by two different membrane types, one type being at least one organophilic membrane, the at least one such membrane unit separating the gas and/or gas vapour mixture into a pressure-reduced permeate enriched with desired condensable gas(es)/gas vapours and a retentate enriched with desired gas(es) of small kinetic diameter at essentially the same pressure set at the inlet end of the organophilic membrane unit(s), combined with at least one glassy membrane, the at least one such glassy membrane unit separating the retentate from the organophilic membrane unit(s) in the membrane separating device into a pressure-reduced permeate enriched with the desired gas(es) of small kinetic diameter and a retentate enriched with such desired condensable gas(es)/vapours at essentially the same pressure set at the inlet end of the glassy membrane unit(s).

2. A process according to claim 1, characterised in that the permeate of the glassy membrane unit is fed through an adsorption device.

3. A process according to claim 2, characterised in that the permeate of the glassy membrane unit(s) has its pressure increased and its temperature lowered before inlet to the adsorption device which is operated in accordance with the pressure swing adsorption principle.

4. A process according to claim 1, characterised in that a desorption or purge gas flow leaving the adsorption device has its pressure increased and its temperature moderated in order to be recycled at any locus of process circuit.

5. A process for the separation and/or recovery of gases from gas and/or gas vapour mixtures by means of a membrane separating device to which the gas and/or gas vapour mixture is supplied, characterized by a multi-stage, simultaneous separation of such gas and/or gas vapour mixtures in the membrane separating device, by two different membrane types, one type being at least one glassy membrane, the at least one such membrane unit separating the gas and/or gas vapour mixture into a pressure-reduced permeate enriched with desired gas(es) of small kinetic diameter and a retentate enriched with desired condensable gas(es)/vapours at essentially the same pressure set at the inlet end of the membrane unit combined with at least one organophilic membrane, the at least one such organophilic membrane unit separating the retentate from the glassy membrane unit(s) in the membrane separating device into a pressure-reduced permeate enriched with the desired condensable gas(es)/vapours and a retentate enriched with such desired gas(es) of small kinetic diameter at essentially the same pressure set at the inlet end of the organophilic membrane unit(s);

wherein the gas(es) of small kinetic diameter are selected from the group consisting of hydrogen and helium.

6. A process according to claim 1 or 5, characterised in that the organophilic membrane(s) of the membrane separating device is an elastomer or rubbery membrane.

7. A process according to claim 6, characterised in that the organophilic membrane(s) is/are made from silicone rubber.

8. A process according to claim 7, characterised in that the silicone rubber is from POMS or PDMS.

9. A process according to claim 1 or 5, characterised in that the glassy membrane(s) is/are manufactured from polyamide-imide(s) or aromatic polyimide(s).

10. A process according to claim 1 or 5, characterised in that the gas and/or gas vapour mixture to be separated is fed to the organophilic membrane unit(s) at a pressure between 1 and 30 bar.

11. A process according to claim 10, wherein the gas and/or vapour mixture to be separated is fed to the organophilic membrane unit(s) at a pressure between 2 and 15 bar.

12. A process according to claim 1 or 5, characterised in that the gas and/or gas vapour mixture to be separated has its temperature moderated before inlet to the organophilic membrane unit(s).

13. A process according to claim 12, characterised in that the temperature is in the range between 0 and 25 C.

14. A process according claim 1 or 5, characterised in that the pressure on the permeate side of the organophilic and glassy membrane units is kept between 1 and 2 bar.

15. A process according to claims 1 or 5, characterised in that the permeate leaving the organophilic membrane unit(s) is pressure-reduced by means of a vacuum pump in order to generate an improved pressure ratio, applicable only if H2-free permeate can be assumed.

16. A process according to claim 1 or 5, characterised in that the gas and/or gas vapour mixture to be separated has its pressure increased before inlet to the glassy membrane unit(s).

17. A process according to claim 16, characterised in that the gas and/or gas vapour mixture fed to the glassy membrane unit(s) is raised to a pressure in the range between 20 and 100 bar.

18. A process according to claim 17, wherein the gas and/or vapour mixture fed to the glassy membrane unit(s) is raised to a pressure in the range between 30 and 40 bar.

19. A process according to claim 1 or 5, characterised in that the temperature of the gas/gas vapour mixtures fed to glassy membrane unit(s) is moderated before inlet to the glassy membrane.

20. A process according to claim 19, characterised in that the temperature is in the range between 40 and 120 C.

21. A process according to claim 20, wherein the temperature is in the range between 70 and 80 C.

22. A process according to claim 1 or 5, characterised in that the permeate of any membrane unit(s) has its pressure increased and its temperature moderated before it is fed to the inlet end of another membrane unit.

23. A process according to claim 1 or 5, characterised in that the retentate leaving the glassy membrane unit(s) and the permeate leaving the organophilic membrane unit(s) are mechanically mixed and subjected to further purification making use of the pressure energy of both streams.

24. A process according to claim 23, characterised in that the further purification takes place in a cooling stage.

25. A process according to claim 24, wherein the cooling stage is a cryogenic distillation unit.

26. A process according to claim 23, characterised in that the further purification takes place in an adsorption/absorption/condensation unit.

27. A process according to claim 1 or 5, characterised in that the gas and/or gas vapour mixture to be separated is pre-treated before inlet to any membrane separation unit.

28. A process according to claim 1 or 5, characterised in that the increase in pressure required for any separation and/or purification unit(s) can be effected by means of a turbo-expander which is driven by means of the pressure energy contained in gas streams available to the process from any locus in the separating device.

* * * * *